United States Patent
Kuo

(10) Patent No.: US 7,489,418 B2
(45) Date of Patent: Feb. 10, 2009

(54) HIGH-RESOLUTION SENSING METHOD FOR SCANNER

(76) Inventor: Shih-Zheng Kuo, No. 21, Alley 8, Lane 57, Yu-Hsi St., Yungho, Taipei Hsien (TW)

( * ) Notice: Subject to any disclaimer, the term of this patent is extended or adjusted under 35 U.S.C. 154(b) by 765 days.

(21) Appl. No.: 09/998,519

(22) Filed: Nov. 27, 2001

(65) Prior Publication Data

US 2003/0099006 A1    May 29, 2003

(51) Int. Cl.
G06F 15/00 (2006.01)
G06K 1/00 (2006.01)
G06K 15/10 (2006.01)
G06K 15/12 (2006.01)

(52) U.S. Cl. .................. 358/1.5; 358/1.7; 358/1.12

(58) Field of Classification Search ............ 358/1.9, 358/474, 509, 520, 1.12, 497, 1.5, 1.7; 348/275, 348/315
See application file for complete search history.

(56) References Cited

U.S. PATENT DOCUMENTS

| | | | |
|---|---|---|---|
| 4,409,625 A * | 10/1983 | Ogasawara | 358/486 |
| 4,451,030 A * | 5/1984 | Teeter et al. | 271/258.01 |
| 5,483,053 A * | 1/1996 | Johnson et al. | 250/226 |
| 5,777,308 A * | 7/1998 | Shimizu et al. | 235/462.11 |
| 6,166,831 A * | 12/2000 | Boyd et al. | 358/483 |
| 6,928,195 B2 * | 8/2005 | Scott et al. | 382/299 |
| 2002/0030861 A1 * | 3/2002 | Ichikawa | 358/505 |

* cited by examiner

*Primary Examiner*—Edward L Coles
*Assistant Examiner*—James A Thompson
(74) *Attorney, Agent, or Firm*—Stolowitz Ford Cowger LLP

(57) ABSTRACT

A high-resolution sensing method for a scanner having a motor and a charge coupled device. The charge coupled device further has m rows of sensors spaced a distance from each other. A motor with a moving speed equal to the width of one row of the sensors divided by an exposure time moves a distance equal to the width of one row of the sensors. During the exposure time, rows of the sensors are used to scan and to obtain image signals that have portions overlapped with each other. Therefore, by simply adding the number of rows of the sensors, the scanner has m times of resolution without changing the speed of the motor.

27 Claims, 6 Drawing Sheets

HIGH-RESOLUTION SENSING METHOD FOR SCANNER

BACKGROUND OF THE INVENTION

1. Field of the Invention

The invention relates in general to a sensing method of a scanner, and more particularly, to a high-resolution sensing method for a scanner.

2. Description of the Related Art

A scanner scans a document by incorporating a charge coupled device that detects the light intensity reflected from the document. The charge coupled device may perform a gray-scale scan or a color scan by using a whole row of sensors to scan the light intensity reflected from the document. FIG. 1 shows a schematic drawing of a conventional scanner.

In FIG. 1, a step motor 102 moves a chassis 108 to an optical resolution distance (that is, the width of one row of sensors in the charge coupled device 104). The light emitted from the lamp 106 projects on the document 110, and is then reflected thereby and travels through a mirror 112, a lens 114 to the sensors 116, 118, 120 (R, G, B sensors) in the charge coupled device 104. The detected image signal is then sent to a subsequent circuit (not shown) for signal processing. The step motor 102 then shifts the chassis with an optical resolution distance along the scan direction. According to the above steps, the image signal detected from the next row of the document 110 is sent to the subsequent circuit for signal processing by the charge coupled device 104. Thereby, the image data for the whole document 110 can be obtained.

While scanning the document 110, the optical resolution of the step motor 102, that is, the distance that the chassis 108 is moved by the step motor 102 each time, is reduced to enhance the scan resolution. For example, the motor moves one step in 10 ms with a rotating speed of 100 pps for one time of the optical resolution. If 16 times of the optical resolutions is required, the step motor 102 moves 16 steps in 10 ms with a rotating speed of 1600 pps. Therefore, the higher the resolution of the scanner 100 is, the more the speed of the step motor 102 varies. It is difficult to design a step motor with a large speed variation. The cost thereof is greatly increased.

SUMMARY OF THE INVENTION

The present invention provides a high-resolution sensing method for a scanner that increases the rows of the sensors to obtain the high-resolution function without changing, or greatly increasing speed variation of the step motor. The design difficulty is thus resolved, while the fabrication cost is not greatly increased.

In the high-resolution sensing method for a scanner provided by the present invention, the scanner has m times of resolutions. The scanner has a motor and a charge coupled device. The charge coupled device further has m rows of spaced sensors. Each of the m rows of sensors is spaced a distance from the other. The motor moves a distance equal to the width of one row of sensors with a moving speed equal to the width of one row of sensor divided by an exposure time. During the exposure time, staggered rows of the sensors are scanned to obtain the image signals.

The present invention further provides a high-resolution sensing method to allow a scanner to have m+1 times of resolution. The scanner has a motor and a charge coupled device. The charge coupled device further has m rows of sensors spaced a distance from each other. The high-resolution sensing method for the scanner includes moving the motor a distance m/(m+1) times the width of one row of the sensors, while the moving speed of the motor is equal to m/(m+1) the width of one row of the sensors divided by an exposure time. During the exposure time, alternate rows of the sensors are scanned to obtain an image signal. Thereby, a high-resolution function of the scanner is obtained without increasing the moving speed of the motor.

Both the foregoing general description and the following detailed description are exemplary and explanatory only and are not restrictive of the invention, as claimed.

DESCRIPTION OF THE PREFERRED EMBODIMENTS

Figure 1:
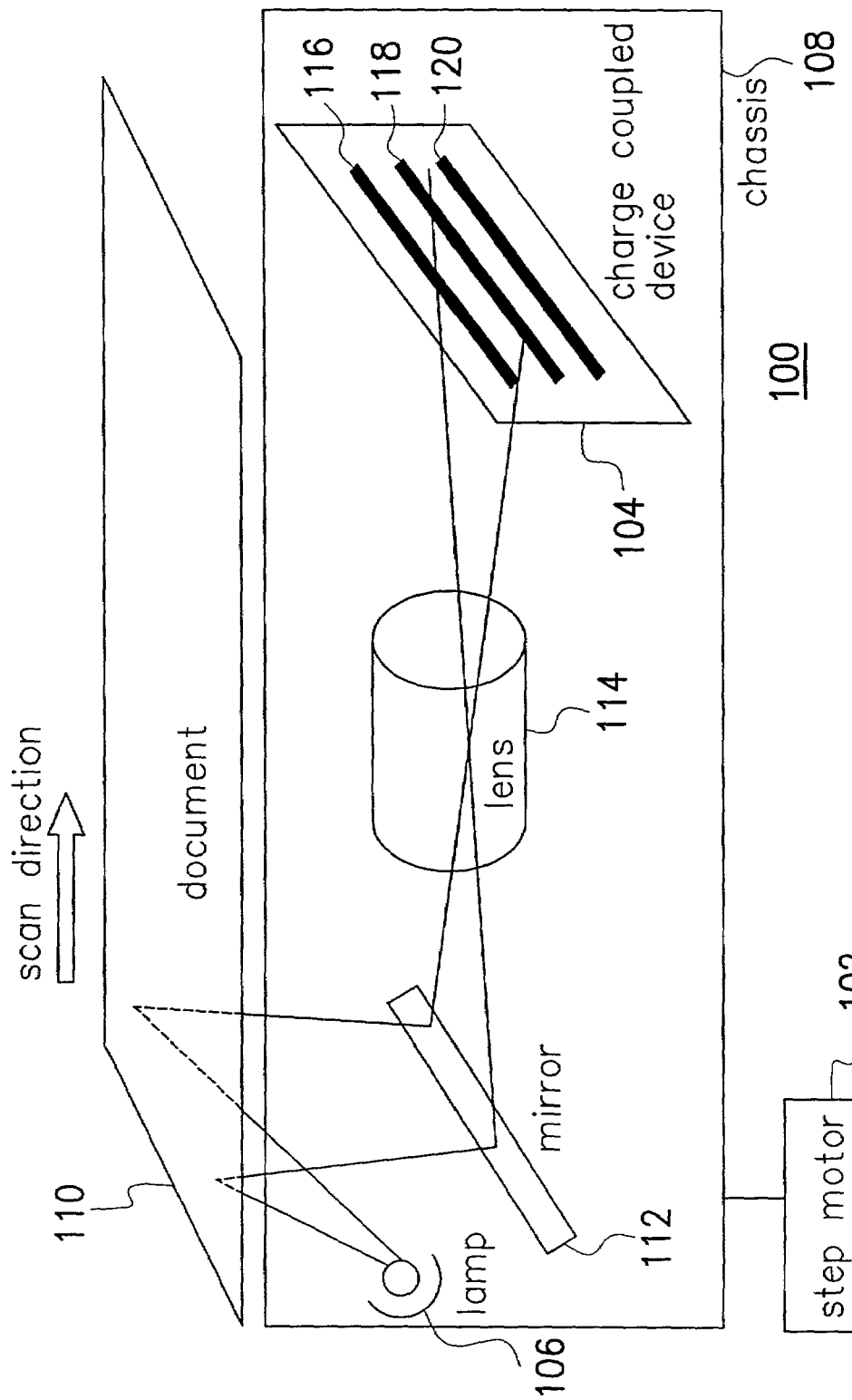
FIG. 1 shows a schematic drawing of a conventional scanner.
Figure 2:
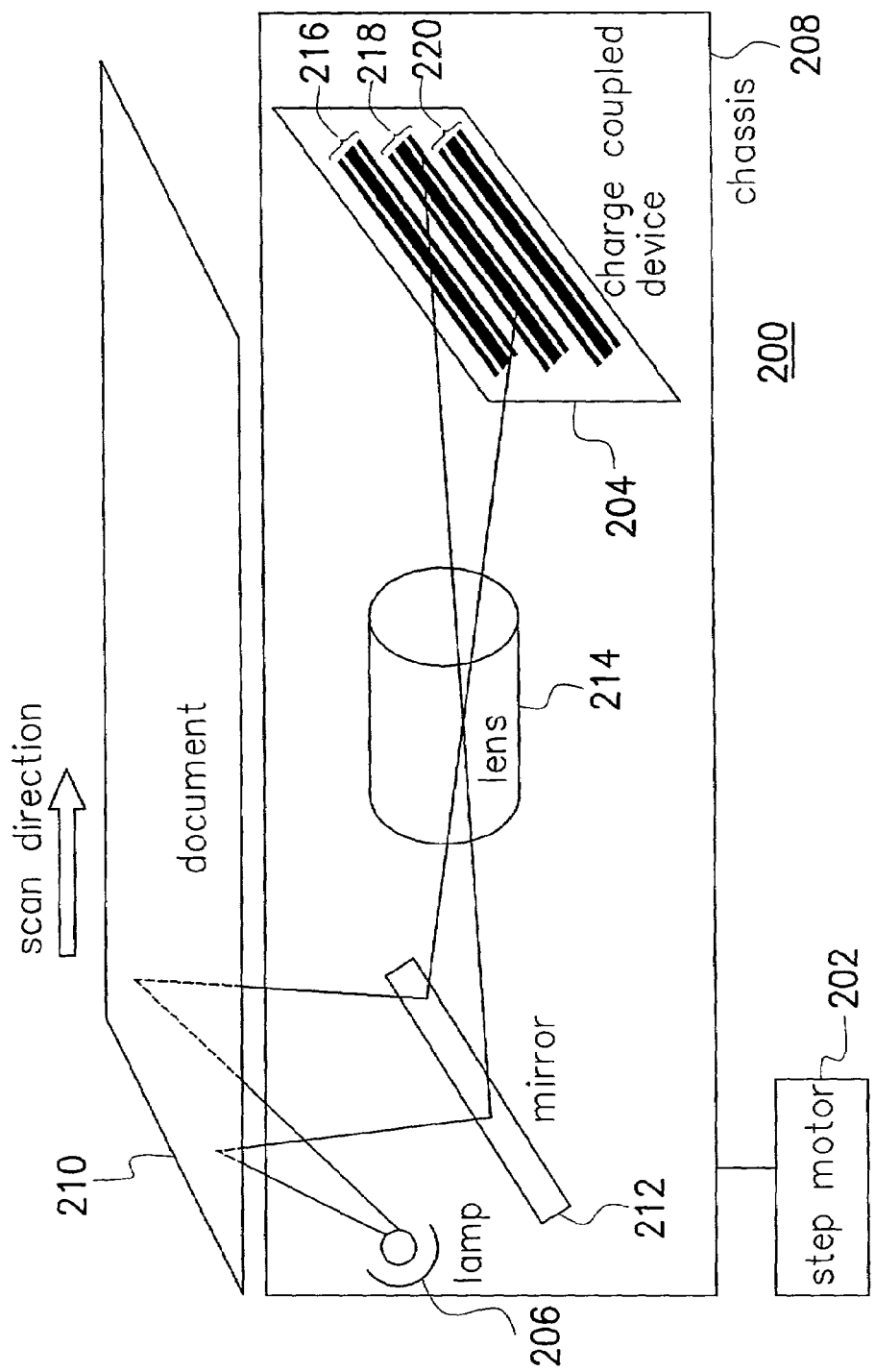
FIG. 2 is a schematic drawing showing a scanner in one embodiment of the present invention.

Referring to FIG. 2, a schematic drawing of a scanner provided in the present invention is shown. In FIG. 2, the step motor 202 moves the chassis 208 an optical resolution distance (that is, the width of one row of sensors of the charge coupled device 204). The lamp 206 projects a light on the document 210. The light incident on the document 210 is reflected through the mirror 212 and the lens 214 to reach the sensors 216, 218 and 220 of the charge coupled device 204. The sensors 216, 218 and 220 include rows of sensors to detect three primary colors R, G, B. The charge coupled device 204 sends the detected image signal to the subsequent circuit (not shown) for signal processing. The step motor 202 then moves the chassis 208 an optical resolution distance along the scan direction. Accordingly, a next image signal corresponding to a next row of the document 210 is sent to the subsequent circuit for signal processing by the charge coupled device 204. Thereby, the image data for the whole document 210 can be scanned and obtained by the scanner 200.

Figure 3:
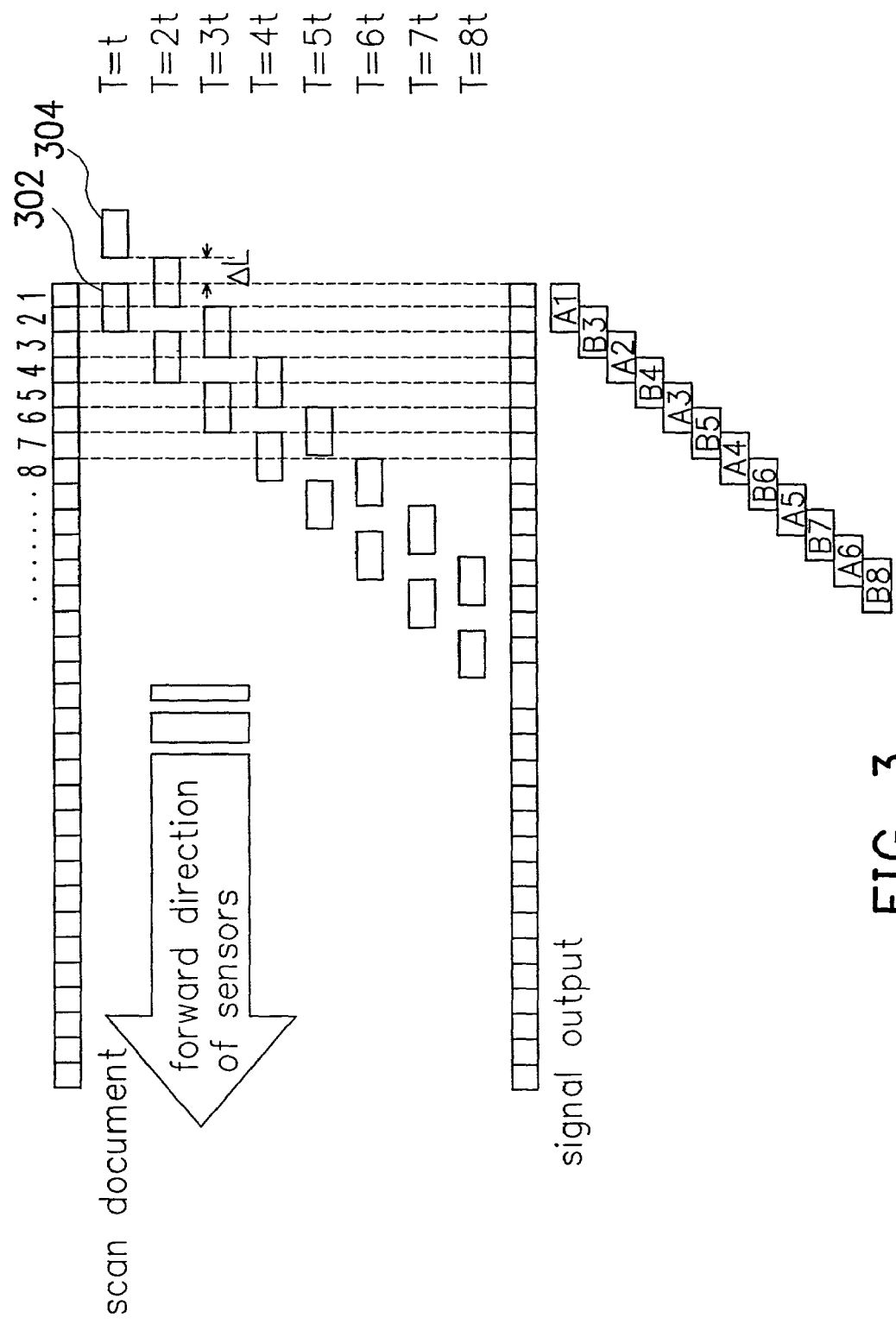
FIG. 3 shows a method of doubling the resolution according to the present invention.

FIG. 3 shows a method of obtaining twice the resolution. In FIG. 3 (also referring to FIG. 2), the step motor 202 moves along the scan direction with a speed of one optical resolution (that is, the moving speed of the step motor 202 V=D/T, where D is the width of one row of sensors and T is the exposure time). The scanner scans the document 210 with double the resolution. Block A indicates the A row of sensors 302, block B indicates the B row of sensors 304, where the B row of sensors 302 and A row of sensors 304 are spaced from each other by a distance ΔL equal to ½D, or alternatively equal to ½D+nD, n is an integer equal to or larger than zero. Again, D is the width of one row of the sensors.

At T=t, the step motor 202 moves along the scan direction the width of one row of the sensors, the A row of sensors 302 scans the first and second regions of the document 210 (the width of scanned two regions of the document 210 is equal to the width of one row of sensors) to obtain an image signal of row A1.

At T=2t, the step motor 202 moves further along the scan direction the width of one row of the sensors, the A row of sensors 302 scans the third and fourth regions of the document 210 to obtain an image signal of row A2.

At T=3 t, the step motor 202 moves along the scan direction the width of one row of the sensors, the A row of sensors 302 scans the fifth and sixth regions of the document 210 (the width of two scanned regions of the document 210 is equal to the width of one row of sensors) to obtain an image signal of row A3. Meanwhile, the B row of sensors 304, spaced a half width of one row of the sensors (equivalent to the width of one scanned region) from the A row of sensors 302, scans the second and the third regions of the document to obtain the image signal of the row B3.

At T=4 t, the step motor 202 moves along the scan direction the width of one row of the sensors, and the A row of sensors 302 scans the seventh and eighth regions of the document 210 (the width of two scanned regions of the document 210 is equal to the width of one row of sensors) to obtain an image signal of row A4. Meanwhile, the B row of sensors 304, spaced a half width of one row of the sensors from the A row of sensors 302, scans the fourth and the fifth regions of the document to obtain the image signal of the row B4.

Accordingly, when the step motor 202 moves with the speed of one optical resolution to scan the document 210, image signals scanned by the A row of sensors 302 and the B row of sensors 304 are obtained from regions spaced a distance equal to one-half the width of one row of the sensors from each other. For example, the image signal of row A1 is obtained by scanning the first and the second regions. The image signal of row B3 is obtained by scanning the second and the third regions, and the image signal of row A2 is obtained by scanning the third and the fourth regions. The image signals are staggered with each other. The image signal of row B4 is obtained by scanning the fourth and the fifth regions, while the image signal of row A3 is obtained by scanning the fifth and the sixth regions, and so on.

All the image signals with overlapped scanned regions detected by row A of sensors 302 and row B of sensors 304 are sent to the subsequent circuit for image processing and data sorting and recording, and a complete image data can be obtained. Therefore, by simply doubling the rows of sensors, the resolution of the scanner is doubled without increasing the optical resolution speed of the step motor 202.

Figure 4:
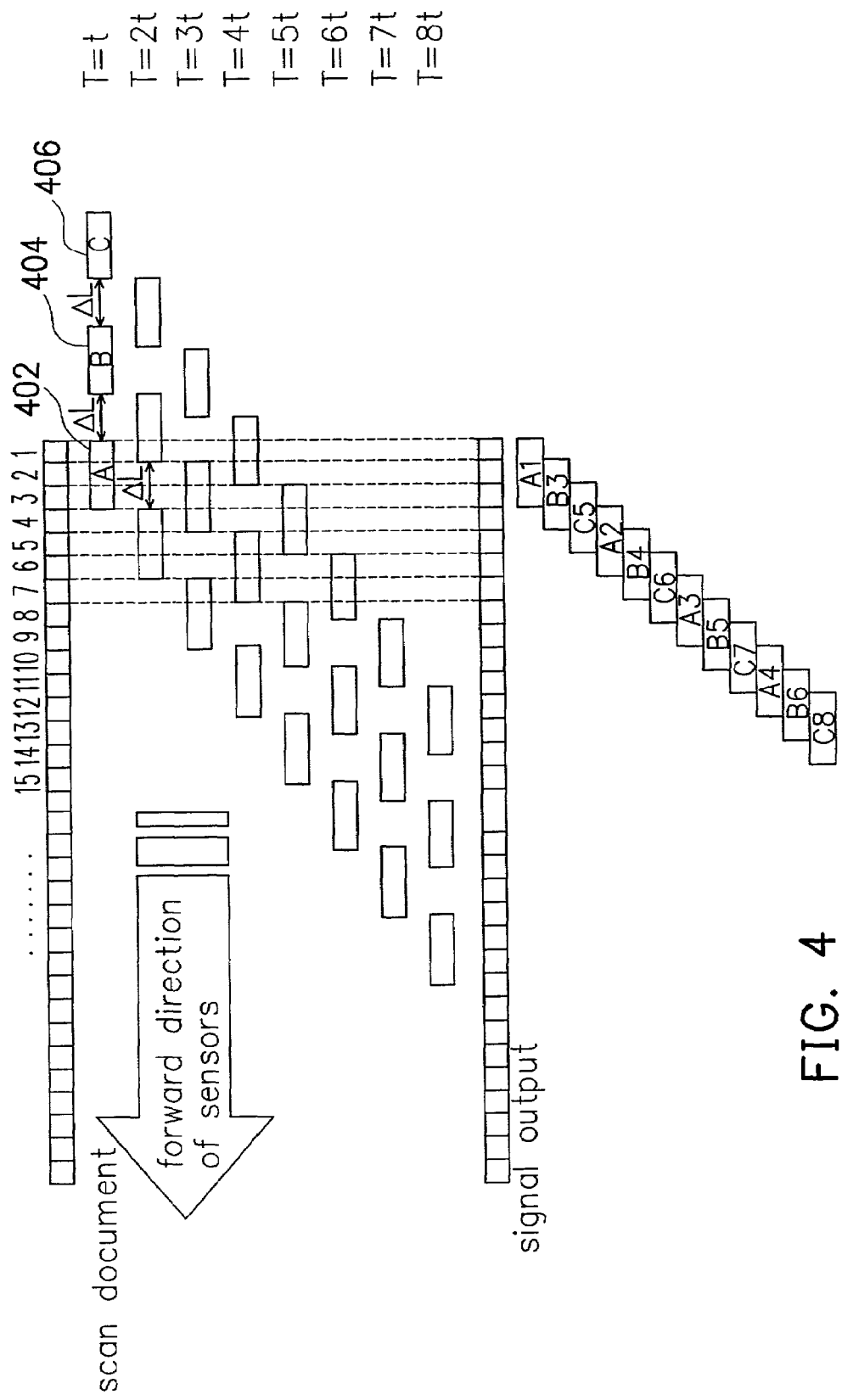
FIG. 4 shows a method of tripling the resolution according to the present invention.

FIG. 4 shows a schematic drawing of the method to triple the resolution. In FIG. 4 (also referring to FIG. 2), the step motor 202 moves along the scan direction with a speed of one optical resolution (that is, the moving speed of the step motor 202 V=D/T, where D is the width of one row of sensors and T is the exposure time). The scanner scans the document 210 with triple resolution. Block A indicates the A row of sensors 402, block B indicates the B row of sensors 404, and block C indicates the C row of sensors 406, where the A row of sensors 402, the B row of sensors 404 and the C row of sensors 406 are spaced from each other by a distance ΔL equal to ⅔D, or alternatively equal to ⅔D+nD, n is an integer equal to and larger than zero. Again, D is the width of one row of the sensors.

At T=t, the step motor 202 moves along the scan direction the width of one row of the sensors, so that the A row of sensors 402 scans the first, the second and the third regions of the document 210 (the width the three scanned regions of the document 210 is equal to the width of one row of sensors) to obtain an image signal of row A1.

At T=2 t, the step motor 202 moves further along the scan direction the width of one row of the sensors, the A row of sensors 402 scans the fourth, the fifth, and sixth regions of the document 210 to obtain an image signal of row A2.

At T=3 t, the step motor 202 moves the width of one row of the sensors along the scan direction, and the A row of sensors 402 scans the seventh, eighth and ninth regions of the document 210 (the width of the scanned three regions of the document 210 is equal to the width of one row of sensors) to obtain an image signal of row A3. Meanwhile, the B row of sensors 404, spaced two-thirds the width of one row of the sensors (equivalent to the width of two scanned region) from the A row of sensors 402, scans the second, the third and the fourth regions of the document to obtain the image signal of the row B3.

At T=4 t, the step motor 202 moves the width of one row of the sensors along the scan direction, and the A row of sensors 402 scans the tenth, eleventh and twelfth regions of the document 210 (the width of the scanned three regions of the document 210 is equal to the width of one row of sensors) to obtain an image signal of row A4. Meanwhile, the B row of sensors 404, spaced two-thirds the width of one row of the sensors from the A row of sensors 302, scans the fifth, the sixth and the seventh regions of the document to obtain the image signal of the row B4.

At T=5 t, the step motor 202 moves the width of one row of the sensors along the scan direction, and the A row of sensors 402 scans the thirteenth, fourteenth, and fifteenth regions of the document 210 (the width of three scanned regions of the document 210 is equal to the width of one row of sensors) to obtain an image signal of row A5. Meanwhile, the B row of sensors 404, spaced two-thirds the width of one row of the sensors from the A row of sensors 402, scans the eighth, the ninth and the tenth regions of the document to obtain the image signal of the row B4. The C row of sensors 406, spaced two-thirds the width of one row of the sensors from the B row of sensors 404, also scans the third, the fourth and the fifth regions of the document to obtain the image signal of the row C5.

Accordingly, when the step motor 202 moves with the speed of one optical resolution to scan the document 210, the A, B and C rows of sensors 402, 404 and 406 scan the regions of the document 210 spaced a distance equal to two-thirds the width of one row of the sensors from each other. The image signals obtained are staggered by one region, for example, the image signal of row A1 from the first, second, third regions, the image signal of row B2 from the second, the third and the fourth regions, and the image signal of row C3 from the third, fourth and the fifth regions.

All the image signals detected by row A of sensors 402, row B of sensors 404, and the row C of sensors 406 are sent to the subsequent circuit for image processing and data sorting and recording, and a complete image data can be obtained. Therefore, by simply tripling the rows of sensors, the resolution of the scanner is tripled without increasing the optical resolution speed of the step motor 202.

Figure 5:
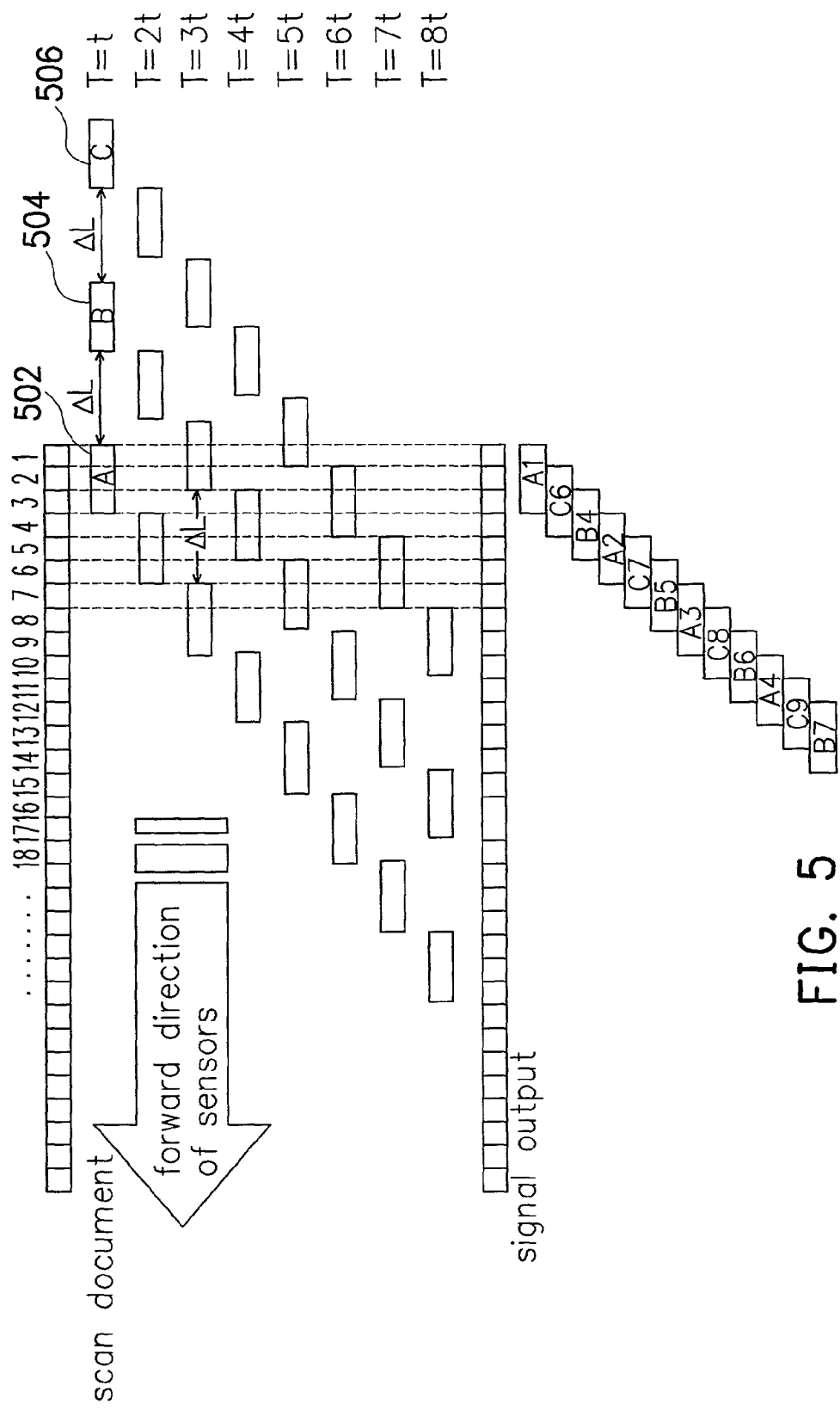
FIG. 5 shows another method of tripling the resolution according to the present invention.

FIG. 5 shows a schematic drawing of another method to triple the resolution. In FIG. 5 (also referring to FIG. 2), the step motor 202 moves along the scan direction with a speed of one optical resolution (that is, the moving speed of the step motor 202 V=D/T, where D is the width of one row of sensors and T is the exposure time). The scanner scans the document 210 with triple resolution. Block A indicates the A row of sensors 502, block B indicates the B row of sensors 504, and block C indicates the C row of sensors 506, where the A row of sensors 502, the B row of sensors 504 and the C row of sensors 506 are spaced from each other by a distance ΔL equal to 4/3D, or alternatively equal to 1/3D+nD, n is an integer equal to or larger than zero. Again, D is the width of one row of the sensors.

At T=t, the step motor 202 moves the width of one row of the sensors along the scan direction, so that the A row of sensors 502 scans the first, the second and the third regions of the document 210 (the width of three scanned regions of the document 210 is equal to the width of one row of sensors) to obtain an image signal of row A1.

At T=2 t, the step motor 202 moves the width of one row of the sensors further along the scan direction, the A row of sensors 502 scans the fourth, the fifth, and sixth regions of the document 210 to obtain an image signal of row A2.

At T=3 t, the step motor 202 moves the width of one row of the sensors along the scan direction, the A row of sensors 502 scans the seventh, eighth and ninth regions of the document 210 (the width of the scanned three regions of the document 210 is equal to the width of one row of sensors) to obtain an image signal of row A3.

At T=4 t, the step motor 202 moves the width of one row of the sensors along the scan direction, the A row of sensors 502 scans the tenth, eleventh and twelfth regions of the document 210 (the width of the three scanned regions of the document 210 is equal to the width of one row of sensors) to obtain an image signal of row A4. Meanwhile, the B row of sensors 504 spaced from the A row of sensors 502 by four-thirds the width of one row of the sensors (equivalent to the width of four scanned regions) scans the third, the fourth and the fifth regions of the document to obtain the image signal of the row B4.

At T=5 t, the step motor 202 moves the width of one row of the sensors along the scan direction, the A row of sensors 502 scans the thirteenth, fourteenth and fifteenth regions of the document 210 to obtain an image signal of row A5. Meanwhile, the B row of sensors 504, spaced four-thirds the width of one row of the sensors from the A row of sensors 502, scans the sixth, the seventh and the eighth regions of the document to obtain the image signal of the row B5.

At T=6 t, the step motor 202 moves the width of one row of the sensors along the scan direction, the A row of sensors 502 scans the sixteenth, seventeenth, and eighteenth regions of the document 210 to obtain an image signal of row A6. Meanwhile, the B row of sensors 504, spaced four-thirds the width of one row of the sensors from the A row of sensors 502, scans the ninth, the tenth and the eleventh regions of the document to obtain the image signal of the row B6. The C row of sensors 506, spaced four-thirds of the width of one row of the sensors from the B row of sensors 504, also scans the second, the third and the fourth regions of the document 210 to obtain the image signal of the row C6.

Accordingly, when the step motor 202 moves with the speed of one optical resolution to scan the document 210, the A, B and C rows of sensors 502, 504 and 506 scan the regions of the document 210 spaced from each other by a distance equal to four-thirds the width of one row of the sensors. The image signals obtained from the regions are spaced the width of one region from each other. For example, the image signal of row A1 from the first, second, third regions, the image signal of row C6 from the second, the third and the fourth regions, and the image signal of row B4 from the third, fourth and the fifth regions are staggered with each other.

All the image signals detected by the row A of sensors 502, the row B of sensors 504, and the row C of sensors 506 are sent to the subsequent circuit for image processing and data sorting and recording, and a complete image data can be obtained. Therefore, by simply tripling the rows of sensors, the resolution of the scanner is tripled without increasing the optical resolution speed of the step motor 202.

Figure 6:
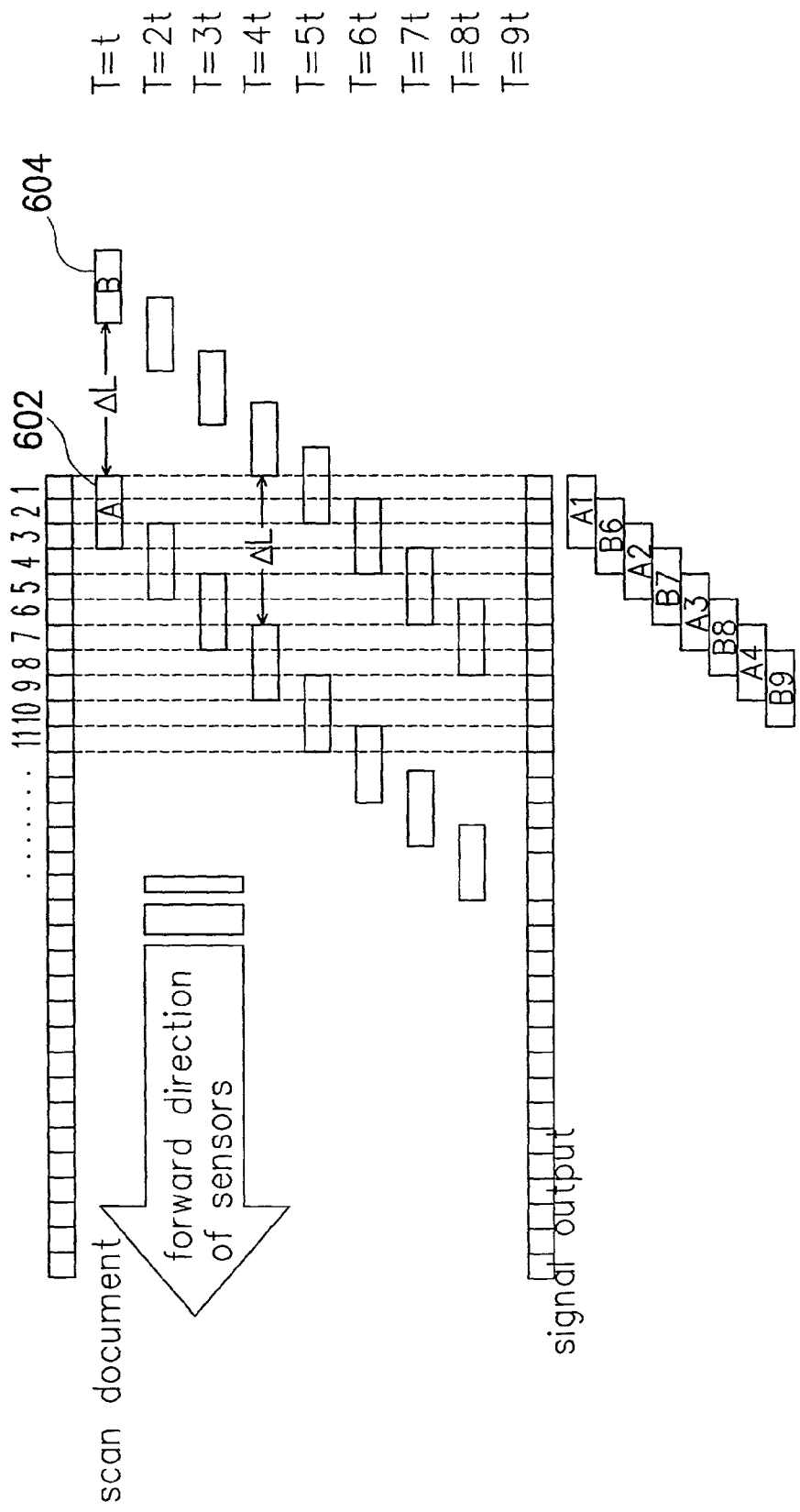
FIG. 6 shows another method tripling the resolution according to the present invention.

FIG. 6 shows a schematic drawing of another method to triple the resolution. In FIG. 6 (also referring to FIG. 2), the step motor 202 moves along the scan direction with a speed of one optical resolution (that is, the moving speed of the step motor 202 V=(2/3)D/T, where D is the width of one row of sensors and T is the exposure time). The scanner 200 scans the document 210 with triple resolution. Block A indicates the A row of sensors 602, and block B indicates the B row of sensors 604, where the A row of sensors 602 and the B row of sensors 604 are spaced from each other by a distance ΔL equal to 2 D, or alternatively equal to 2 nD, where n is an integer equal to or larger than zero. Again, D is the width of one row of the sensors.

At T=t, the step motor 202 moves two-thirds the width of one row of the sensors along the scan direction, so that the A row of sensors 602 scans the first, the second and the third regions of the document 210 (the width the three scanned regions of the document 210 is equal to the width of one row of sensors) to obtain an image signal of row A1.

At T=2 t, the step motor 202 moves two-thirds the width of one row of the sensors further along the scan direction, the A row of sensors 602 scans the third, the fourth and the fifth regions of the document 210 to obtain an image signal of row A2.

At T=3 t, the step motor 202 moves two-thirds the width of one row of the sensors along the scan direction, the A row of sensors 602 scans the fifth, sixth and seventh regions of the document 210 to obtain an image signal of row A3.

At T=4 t, the step motor 202 moves two-thirds the width of one row of the sensors along the scan direction, the A row of sensors 602 scans the seventh, eighth and ninth regions of the document 210 to obtain an image signal of row A4.

At T=5 t, the step motor 202 moves two-thirds the width of one row of the sensors along the scan direction, the A row of sensors 602 scans the ninth, tenth and eleventh regions of the document 210 to obtain an image signal of row A5.

At T=6 t, the step motor 202 moves two-thirds the width of one row of the sensors along the scan direction, the A row of sensors 602 scans the eleventh, twelfth and thirteenth regions of the document 210 to obtain an image signal of row A6. Meanwhile, the B row of sensors 604, spaced the width of two rows of the sensors (equivalent to the width of six scanned regions) from the A row of sensors 602, scans the second, the third and the fourth regions of the document to obtain the image signal of the row B6.

Accordingly, when the step motor 202 moves with the speed of two-thirds the optical resolution to scan the document 210, the A and B rows of sensors 602, 604 scan the regions of the document 210 spaced from each other by the width of one region. For example, the image signal of row A1 is obtained from the first, second, and third regions, the image signal of row B6 is obtained from the second, the third and the fourth regions, and the image signal of row A2 is obtained from the third, fourth and the fifth regions.

All the image signals detected by the row A of sensors 602 and the row B of sensors 604 are sent to the subsequent circuit for image processing and data sorting and recording, and a complete image data can be obtained. Therefore, by changing the optical resolution speed of the step motor to two-thirds of the original speed and increasing the number of rows of the sensors from one to two, the resolution of the scanner 200 is tripled.

Accordingly, one can further increase the resolution of the scanner (more than triple) by increasing the rows of the sensors, or by changing speed of the step motor into m/(m+1) of the original speed, and increasing the rows of sensors to m rows. Consequently, the resolution is m+1 times multiplied.

Therefore, the present invention increases the resolution of the scanner without increasing the design difficulty of the step motor and raising the cost issue.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A sensing method for a scanner, wherein the scanner comprises an image sensor, and wherein the image sensor comprises a first row of sensors and a second row of sensors, the sensing method comprising:
    scanning a first document portion with the first row of sensors and concurrently scanning a second document portion with the second row of sensors, wherein the first and the second document portions are not adjacent to each other;
    scanning a third document portion with the first row of sensors and concurrently scanning a fourth document portion with the second row of sensors, wherein the third document portion partially overlaps the first document portion; and
    processing first scanned image data associated with the first document portion and second scanned image data associated with the third document portion to generate third image data of the partially overlapped document portion, wherein a resolution of the third image data is greater than a resolution of at least one of the first scanned image data and the second scanned image data.

2. The sensing method according to claim 1, wherein the resolution of the third image data is double the resolution of the first scanned image data.

3. The sensing method according to claim 1, further comprising:
    moving the image sensor at a scanning speed, and wherein the resolution of the third image data increases with an increase in a number of rows of sensors in the image sensor without changing the scanning speed.

4. The sensing method according to claim 3, further comprising:
    scanning a fifth document portion with a third row of sensors of the image sensor, wherein the fifth document portion partially overlaps both the first document portion and the third document portion; and
    processing fourth scanned image data associated with the fifth document portion to generate fifth image data of the partially overlapped document portion, wherein the resolution of the fifth image data is triple the resolution of the fourth scanned image data.

5. The sensing method according to claim 1, wherein the first document portion does not partially overlap the fourth document portion.

6. A method comprising:
    scanning a first document portion using a first row of sensors of an image sensor, wherein the image sensor further comprises a second row of sensors;
    moving the image sensor a width of the first row of sensors, wherein the image sensor moves at a scanning speed;
    scanning a second document portion using the second row of sensors, wherein the second document portion partially overlaps the first document portion; and
    processing scanned data associated with the first and second document portions to generate a complete image data for the partially overlapped document portion, wherein a resolution of the complete image data is greater than a resolution of the scanned data without changing the scanning speed.

7. The sensing method according to claim 6, wherein the first and the second row of sensors are separated by a distance that is greater than or equal to the width of the first row of sensors.

8. The sensing method according to claim 6, wherein the second document portion is scanned after the first document portion, and wherein the second row of scanners is configured to scan a third document portion concurrently with the scanning of the first document portion.

9. The sensing method according to claim 8, wherein the third document portion is not adjacent to the first document portion.

10. An apparatus, comprising:
    means for scanning a first document portion during a first exposure period;
    means for moving a scanning chassis a distance substantially equal to a width of a row of scanning sensors;
    means for scanning a second document portion during a second exposure period, wherein the second document portion partially overlaps the first document portion; and
    means for generating a complete image data for the partially overlapped document portion, wherein a resolution of the complete image data is greater than a resolution of the row of scanning sensors.

11. The apparatus of claim 10, wherein the resolution of the complete image data increases with an increase in a number of rows of scanning sensors without changing a scanning speed of the scanning chassis.

12. A method, comprising:
    scanning concurrently a first portion and a second portion of a document using a first row of sensors for the first document portion and a second row of sensors for the second document portion, wherein the first and second document portions are not adjacent to each other, and wherein the first and second rows of sensors are spaced apart from each other;
    scanning concurrently a third portion and a fourth portion of a document using the first row of sensors for the third document portion and the second row of sensors for the fourth document portion, wherein the third and first document portions partially overlap each other; and
    processing scanned data associated with the first and third document portions from the first and second rows of sensors to produce image data for the partially overlapped document portion.

13. The method of claim 12, wherein a resolution of the image data is greater than a resolution of the scanned data.

14. An apparatus, comprising:
    means for scanning concurrently a first portion and a second portion of a document using a first row of sensors for the first document portion and a second row of sensors for the second document portion, wherein the first and second document portions are not adjacent to each other, and wherein the first and second rows of sensors are spaced apart from each other;
    means for moving an image sensor a distance equal to a width of the first row of sensors, wherein the image sensor comprises the first and second row of sensors;
    means for scanning concurrently a third portion and a fourth portion of the document using the first row of sensors for the third document portion and the second row of sensors for the fourth document portion, wherein the third and fourth document portions are not adjacent to each other, and wherein the third document portion partially overlaps the first document portion; and means for generating image data for the partially overlapped document portion by combining scanned data associated with the first and third document portions from the first and second rows of sensors.

15. The apparatus of claim 14, wherein the third document portion is scanned after the first document portion is scanned, and wherein a resolution of the image data is greater than a resolution of the scanned data.

16. A method, comprising:

scanning a first scanning region using a first array of sensors during a first time period, wherein the first scanning region comprises a first document portion and a second document portion;

scanning a second scanning region using a second array of sensors during a second time period, wherein the second scanning region comprises the second document portion and a third document portion; and processing scanned data associated with the first and second scanning regions to generate a complete image data for the second document portion, wherein the first and second arrays of sensors are spaced apart from each other, and wherein a resolution of the complete image data is greater than a resolution of the scanned data.

17. The method of claim 16, further comprising:

moving a scanning chassis a first distance equal to a width of the first array of sensors while the first scanning region is being scanned, wherein the scanning chassis comprises the first and second array of sensors; and moving the scanning chassis a second distance equal to a width of the second array of sensors while the second scanning region is being scanned.

18. An apparatus, comprising:

means for scanning a first scanning region using a first array of sensors during a first time period, wherein the first scanning region comprises a first portion and a second portion;

means for scanning a second scanning region using a second array of sensors during a second time period, wherein the second scanning region comprises the second portion and a third portion;

means for moving the first and second array of sensors at a scanning speed; and means for processing scanned data associated with the first and second scanning regions to generate a complete image data for the second document portion, wherein a resolution of the complete image data is greater than a resolution of the scanned data without changing the scanning speed.

19. The apparatus of claim 18, wherein the first and second array of sensors are configured to concurrently scan different scanning regions, and wherein the different scanning regions are not adjacent to each other.

20. A scanning device, comprising:

an image sensor comprising a plurality of rows of sensors, wherein each of the plurality of rows of sensors are spaced apart from each other;

a motor, wherein the motor is configured to move the image sensor, during an exposure time, a distance substantially equal to a width of one of the plurality of rows of sensors at a speed substantially equal to the width divided by the exposure time, wherein the plurality of rows of sensors are adapted to concurrently scan a first set of document portions during the exposure time, and wherein each portion of the first set of document portions is not adjacent to any other portion of the first set of document portions; and a processor configured to process first scanned image data associated with the first set of document portions together with second scanned image data associated with a second set of document portions to generate a third image data, wherein the third image data comprises an improved resolution compared with either of the first and second scanned image data.

21. The scanning device of claim 20, wherein each portion of the second set of document portions is not adjacent to any other portion of the second set of document portions.

22. The scanning device of claim 21, wherein the first set of document portions is scanned during a first exposure time, and wherein the second set of document portions is scanned during a second exposure time.

23. A scanning device, comprising:

a first row of sensors configured to scan a first document region comprised of a first portion and a second portion;

a second row of sensors configured to scan a second document region comprising the second portion and a third portion, wherein the second row of sensors is spaced apart from the first row of sensors;

a motor configured to move a scanning chassis, during a first exposure time, a distance substantially equal to a width of the first row of sensors, wherein the motor is further configured to move the scanning chassis, during a second exposure time, a distance substantially equal to a width of the second row of sensors; and a processor configured to process scanned data associated with the first and second document regions, wherein the processor is further configured to generate a complete image data for the second portion from the scanned data, and wherein a resolution of the complete image data is greater than a resolution of the scanned data.

24. The scanning device of claim 23, wherein the motor is configured to move the scanning chassis at a constant scanning rate during both the first and second exposure times.

25. The scanning device of claim 23, wherein the first document region is scanned during the first exposure time, and wherein the second document region is scanned during the second exposure time.

26. The scanning device of claim 23, wherein the first and second rows of sensors are positioned in a single image sensor.

27. The scanning device of claim 23, wherein the first portion of the first document region does not overlap with the third portion of the second document region.

* * * * *